United States Patent
Holmdahl et al.

(10) Patent No.: US 9,157,766 B2
(45) Date of Patent: Oct. 13, 2015

(54) AUTOMATED RECONFIGURATION OF UTILITY METERS

(71) Applicant: Itron, Inc., Liberty Lake, WA (US)

(72) Inventors: Bret Gregory Holmdahl, Greenacres, WA (US); Eric Lambert, Otis Orchards, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/931,673

(22) Filed: Jun. 28, 2013

(65) Prior Publication Data

US 2014/0055282 A1 Feb. 27, 2014

Related U.S. Application Data (60) Provisional application No. 61/692,383, filed on Aug. 23, 2012.

(51) Int. Cl.
| | | |
|---|---|---|
| *G01D 4/00* | (2006.01) | |
| *G01D 5/00* | (2006.01) | |
| *H04Q 9/00* | (2006.01) | |
| *H04W 84/18* | (2009.01) | |

(52) U.S. Cl.
CPC ............... *G01D 4/006* (2013.01); *G01D 4/004* (2013.01); *H04Q 9/00* (2013.01); *H04W 84/18* (2013.01);

(Continued)

(58) Field of Classification Search
CPC .... G01D 4/004; Y02B 90/242; Y02B 90/246; Y04S 20/322; Y04S 20/42; H04W 76/02; H04W 76/021; H04W 76/022; H04W 76/023; H04W 76/025; H04W 76/026; H04W 76/04; H04W 76/041; H04W 76/043; H04W 76/046; H04W 76/48; H04W 76/06; H04W 76/062; H04W 76/064; H04W 76/066; H04W 76/068

USPC ............... 340/870.13, 870.02; 370/395.4
See application file for complete search history.

(56) References Cited

U.S. PATENT DOCUMENTS 4,804,957 A * 2/1989 Selph et al. ............... 340/870.03
7,116,243 B2 * 10/2006 Schleich et al. .......... 340/870.02

(Continued)

FOREIGN PATENT DOCUMENTS

| KR | 20080112692 | 12/2008 |
|---|---|---|
| KR | 20100115406 | 10/2010 |
| KR | 20120071882 | 7/2012 |

OTHER PUBLICATIONS

The PCT Search Report and Written Opinion mailed Oct. 16, 2013 for PCT application No. PCT/US13/48767, 11 pages.

*Primary Examiner* — Ariel Balaoing
*Assistant Examiner* — John Bamert
(74) *Attorney, Agent, or Firm* — Lee & Hayes, PLLC (57) ABSTRACT

Techniques for reconfiguring utility meters from a mobile mode to a network mode are discussed. A utility meter may be configured for operation in a mobile mode environment, wherein it transmits data using radio frequency (RF) transmissions, such as by "bubbling-up" a "standard consumption message" at intervals. However, a switchover from mobile mode to network mode may be scheduled. The switchover may involve a plurality of endpoints (i.e., metering devices together with associated mobile mode and network mode functionality) transitioning from mobile mode functionality to network mode functionality. In one example, processors on an endpoint using a first "image" including executable software providing mobile mode functions may reboot to use a second image providing fixed network mode functions (e.g., mesh or star network operability). Following the transition, the endpoints may discover adjacent or nearby endpoints, and a fixed network having network mode functionality may be configured.

17 Claims, 7 Drawing Sheets

(52) U.S. Cl.
CPC .............. *Y02B 90/242* (2013.01); *Y02B 90/243* (2013.01); *Y02B 90/246* (2013.01); *Y04S 20/322* (2013.01); *Y04S 20/325* (2013.01); *Y04S 20/42* (2013.01)

(56) References Cited

U.S. PATENT DOCUMENTS

| | | | |
|---|---|---|---|
| 7,394,761 B2* | 7/2008 | Foster et al. | 370/227 |
| 7,479,895 B2* | 1/2009 | Osterloh et al. | 340/870.02 |
| 7,756,078 B2* | 7/2010 | Wyk et al. | 370/328 |
| 8,164,481 B2* | 4/2012 | Klaus et al. | 340/870.02 |
| 2005/0237959 A1 | 10/2005 | Osterloh et al. | |
| 2007/0013547 A1* | 1/2007 | Boaz | 340/870.02 |
| 2008/0122651 A1* | 5/2008 | Niederfeld et al. | 340/870.03 |
| 2008/0219210 A1* | 9/2008 | Shuey et al. | 370/329 |
| 2011/0016321 A1* | 1/2011 | Sundaram et al. | 713/171 |
| 2011/0018704 A1* | 1/2011 | Burrows | 340/538 |
| 2012/0078547 A1* | 3/2012 | Murdoch | 702/62 |

* cited by examiner

AUTOMATED RECONFIGURATION OF UTILITY METERS

RELATED APPLICATIONS

This patent application claims priority to U.S. patent application Ser. No. 61/692,383, titled "Automated Reconfiguration of Utility Meters", filed on 23 Aug. 2012, commonly assigned herewith, and hereby incorporated by reference.

BACKGROUND

Electricity, natural gas and water are examples of consumables that may be delivered and sold within a metered environment. The metered environment may be configured in an automated meter reading (AMR) configuration and/or an advanced metering infrastructure (AMI). A first example of the metered environment operates according to a mobile mode or state. In the mobile mode, meters may transmit consumption messages over one or more radio frequencies (RF). The transmitted consumption messages may be received by a mobile or portable device, which may include a vehicle-based or handheld radio. A second example of the metered environment operates according to a network mode or state. In the network mode, metering devices are configured as nodes in a fixed network (e.g., a "mesh network" or a "star network") wherein consumption messages are passed from nodes directly or indirectly to a root node or other data collector.

In many environments, metering devices have a lifetime of twenty years or more. Even gas and water meters, which may depend on battery power, may have such a lifespan. Because of the lifespan of such equipment, it may be difficult to justify transitioning an entire metering environment at once from a metered environment based on a mobile mode to a metered environment based on a network mode.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for performing an automated reconfiguration of one or more utility meters within a metered environment. The reconfiguration may be from mobile mode to network mode functionality. In one example, utility meters may be configured for operation in a mobile mode. Within the mobile mode, utility meters may transmit data using an RF signal (e.g., they may "bubble-up" a "standard consumption message") at intervals that may be periodic, random, scheduled, etc. According to the mobile mode, the transmitted data may be received by a mobile radio. However, at some point, a utility company may decide to upgrade their network to a fixed network (not using a mobile mode). At that point, it may be desirable to "upgrade" the meter to a network mode of operation. For instance, as a region becomes more densely populated, the number and proximity of meters may make it more efficient to configure as a fixed network. Accordingly, a switchover from the mobile mode to the network mode may be scheduled. The switchover may involve a plurality of endpoints (i.e., utility meters) transitioning from mobile mode to network mode functionality. In one example, processors on an endpoint using a first "image" including executable software providing mobile mode functions (e.g., bubble-up of standard consumption messages) may instead begin use of a second image providing fixed network mode functions (e.g., mesh network operability). Following the transition, the endpoints may discover adjacent or nearby endpoints, and a fixed (e.g., mesh) network may be configured.

The discussion herein includes several sections. Each section is intended to provide examples of techniques and/or structures, but is not intended to indicate elements which must be used and/or performed. A section entitled "Example Mobile Mode Environment" discusses aspects of meters— which are constructed and programmed for automated reconfiguration from the mobile mode environment to a network mode environment—operating within a mobile mode environment. A section entitled "Example Network Mode Environment" discusses aspects of similar meters operating within a network mode environment. A section entitled "Example Meter Construction" discusses example construction of a meter configured for automated reconfiguration from a mobile mode environment to the network environment. A section entitled "Example Methods, Timing and Event Sequences" discusses example operations to perform automated reconfiguration from the mobile mode environment to a network environment. This brief introduction is provided for the reader's convenience and is not intended to describe and/or limit the scope of the claims or any section of this disclosure.

Example Mobile Mode Environment

Figure 1:
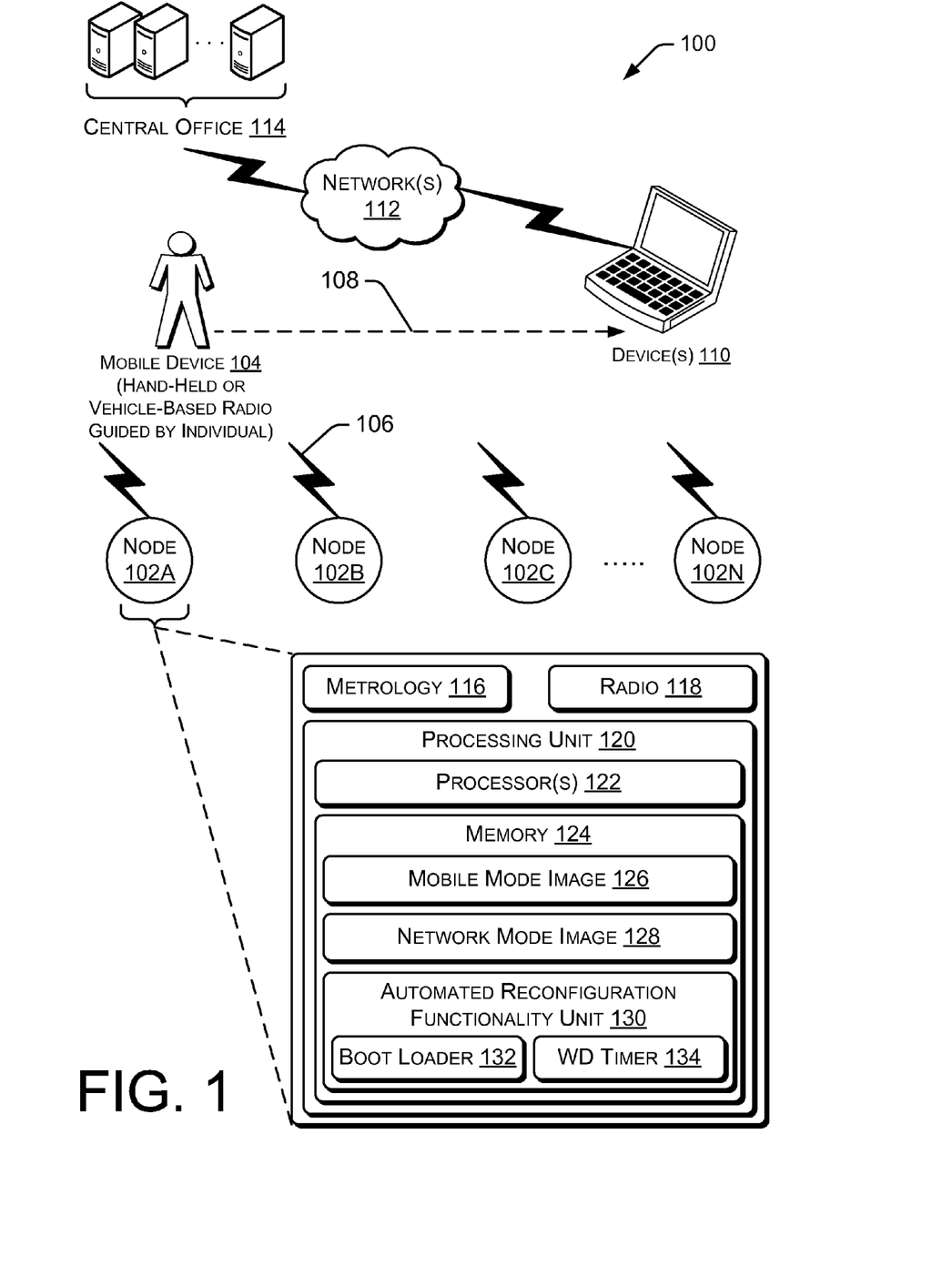
FIG. 1 is block diagram showing an example of operation of utility meters in mobile mode or configuration, wherein meters bubble up consumption messages to a mobile radio device.

FIG. 1 shows an example metered environment configured as a mobile mode system 100. The mobile mode system 100 includes a plurality of utility meters that may measure consumption of electricity, natural gas, water and/or other consumable resources. Each meter may be integrated with a radio and data processing functionality, and may constitute a node within the mobile mode system 100. In the example, nodes 102A through 102N represent smart meters that transmit information to a radio of a mobile device 104, which may be handheld or vehicle-based. The mobile device 104 may include a radio, a processor, memory and software, and which may be guided and/or operated by an individual. The nodes 102 may communicate with the mobile device 104 by means of radio frequency (RF) transmissions 106. The transmissions 106 may be broadcast periodically, randomly or at another interval or frequency, and may include a consumption message (e.g., a standard consumption message that indicates node identification, a meter reading, a consumption value, and/or a date and time, etc.).

The mobile device 104 may be moved along a route 108, which may bring it into proximity to a plurality of nodes 102A through 102N. As the mobile device 104 passes along the route 108, it will gather data from the consumption messages and transmissions 106 from the nodes 102. The data gathering process may be performed by the internal data processor (e.g., microprocessor, memory, software and/or ASIC) and the radio. Those consumption messages may be aggregated in a desired format and stored in a computing device 110. The computing device 110 may transmit the consumption information over one or more networks 112 (e.g., a local area network, neighborhood area network, a cellular network and/or the Internet) to a central office 114 or other data storage and/or processing facility.

Figure 3:
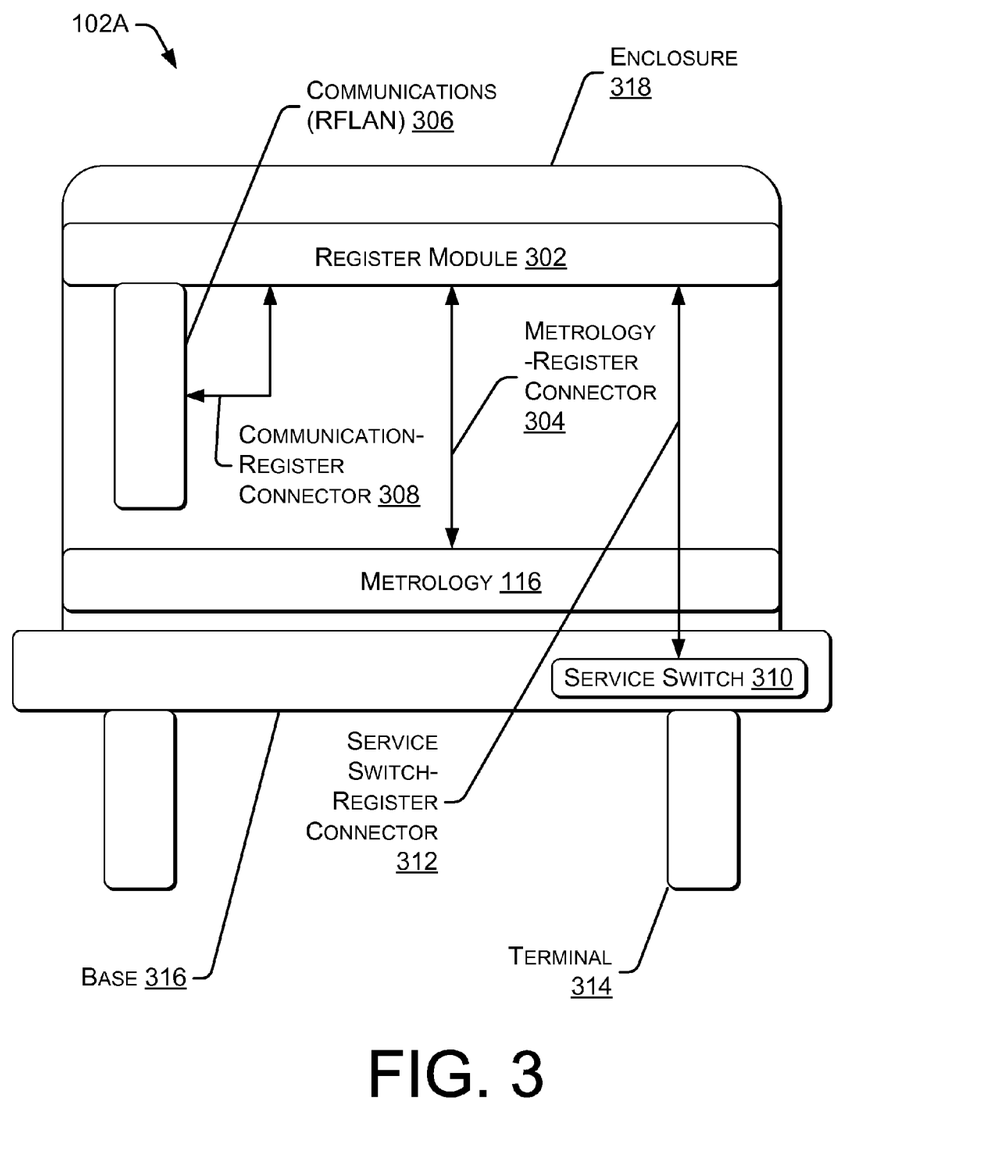
FIG. 3 is a block diagram showing an example of a utility meter configured for automated reconfiguration between mobile and network modes.

Detail of node 102A is shown as an example of structure and function that may be utilized in one or more nodes. Metrology 116 is representative of resource consumption measurement devices for measurement of electricity, natural gas, water, etc. The radio 118 may function both as a receiver and a transmitter. In the example of FIG. 3, the radio 118 may send transmissions 106 to the mobile device 104. The transmissions 106 may include consumption data (e.g., obtained from metrology 116) and/or other data.

A processing unit 120 may include a processor 122 in communication with one or more memory devices 124. The processing unit 120 may receive data from, and/or communicate with, the metrology 116 and the radio 118. The processor 122 may be a microprocessor, microcontroller, application specific integrated circuit (ASIC) or other device configured to process data.

The memory 124 may include programs, applications and/or data files, and may be read from, and/or written-to, by the processor 122. In the example shown, a mobile mode image 126 may include software to program the node 102 to function within a metered environment according to a mobile mode. The mobile mode image 126 may include functionality-providing program(s), application(s), data file(s) and/or an image including one or more of these elements. For example, statements within mobile mode image 126 executed by the processor 122 may result in data gathering from the metrology 116, data packaging into appropriate consumption messages and/or data transmission by the radio 118.

A network mode image 128 may include executable software that allows the node 102 to function within a network environment. For example, executable statements, functionality-providing program(s), application(s) and/or data file(s) in the network mode image 128, when executed by the processor 122, may allow the node 102 to function as a node in a network environment (e.g., the mesh network environment of FIG. 2).

Figure 2:
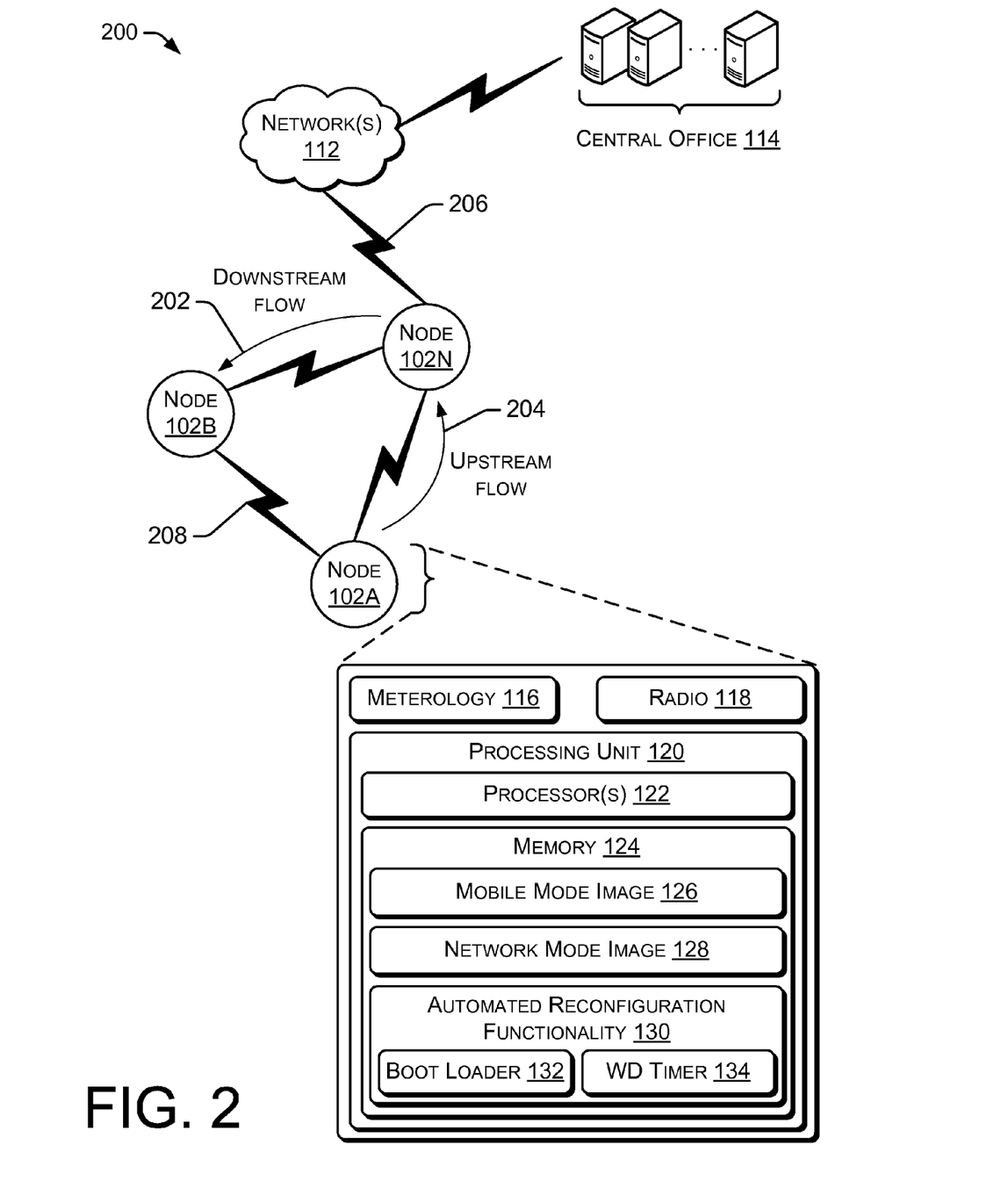
FIG. 2 is block diagram showing an example of operation of utility meters in a network mode or configuration, wherein meters communicate with adjacent meters and consumption data is moved through the network to/from a central office or headquarters.

An automated reconfiguration functionality unit 130 may include executable software that allows the node 102 to reconfigure from operation in the mobile mode environment (e.g., using the mobile mode image 126 within the environment of FIG. 1) to operation in the network environment (e.g., using the network mode image 128 in the environment of FIG. 2). In the example shown, a boot loader 132 may be used to reboot the processing unit 120, and to thereby transition from operation using the mobile mode image 126 to operation using the network mode image 128. In one example, the boot loader may configure addressing of memory in the processing unit to transition the processing unit from execution of the image providing mobile mode functionality to the image providing network mode functionality. The boot loader 132 may begin operation at the direction of the watch dog timer 134 or other signaling, timing or commanding device.

Example Network Mode Environment

FIG. 2 shows an example metered environment configured as a network mode system 200. For example, a switchover of the mobile mode system 100 of FIG. 1 may result in the same meters being reconfigured as the network mode system 200 of FIG. 2. The network mode system 200 includes a plurality of utility meters that may measure consumption of electricity, natural gas, water or other consumable resource. Each meter may be integrated with a radio and data processing functionality, and may constitute a node within the network mode system 200. In the example, nodes 102A through 102N represent smart meters that transmit information through a mesh network. The information may include downstream flows 202 of packets, which may include commands and information passing through a network 112 and originating from the central office 114. The information within the mesh network may include upstream flows 204 of packets, which may include data obtained from the metrology 116 and reported to the central office 114. Both the downstream data flows 202 and upstream data flows 204 may be made over RF links 206 between various nodes and/or other networks.

The network mode system 200 may be configured as a mesh network (as shown in FIG. 2) or as a "star" network (in other embodiments). In a mesh network configuration, nodes 102A and 102B may communicate over a link 208. However, in a star configuration, link 208 may be missing, and nodes 102A and 102B would communicate directly with a center node 102N of the star (e.g., a data collector).

Example Meter Construction

FIG. 3 is a block diagram showing an example node 102A, operable within the mobile mode system 100 of FIG. 1 and the network mode system 200 of FIG. 2. The node 102A may include utility meter functionality, including metrology 116. A register module 302 may include the processing unit 120 of FIGS. 1 and 2. A metrology-register connector 304 may be used to provide communications between the register module 302 and the metrology 116.

A communications module 306 may include the radio 118 of FIGS. 1 and 2. The communications module 306 may be configured for two-way RF transmissions, and may be configured for use in a local area network (LAN), home area network (HAN), cellular network or other network environment. A communications register connector 308 may be used to provide communications between the communications module 306 and the register module 302.

A service switch 310 may allow service (e.g., provision of electrical power to a customer) to be turned on and/or off. The service switch 310 may be connected to the register module 302 by a service switch-register connector 312. Accordingly, functionality (e.g., execution of software or hardware devices in the register module 302) may control the operation and the setting of the service switch 310. The node may include electrical terminals 314, a base 316 and an enclosure 318.

Example Methods, Timing and Event Sequences

FIGS. 4-7 show operations, methods and techniques that may be represented by a collection of acts, blocks or operations in a logical flow graph, which represent a sequence of operations that can be implemented and/or executed by hardware, software, or a combination thereof. In one example, one or more functional blocks may be implemented by aspects including a microprocessor, a microcontroller, one or more memory devices, application specific integrated circuits, software blocks, subroutines and/or programs, etc.

Memory devices, computer-readable media and/or computer storage media may include volatile and non-volatile, removable and non-removable media implemented according to any techniques or technology for storage of information such as computer-readable instructions, data structures, program modules, or other data. Computer-readable media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Any such computer-readable media (e.g., memory 124 of FIGS. 1 and 2) may be part of a system or device (e.g., meter 102). Moreover, the computer-readable media may include computer-executable instructions that, when executed by the processor(s), perform various functions and/or operations described herein. Such computer- and/or processor-readable memory and/or media may retain the instructions in a persistent and/or non-transitory manner.

Figure 4:
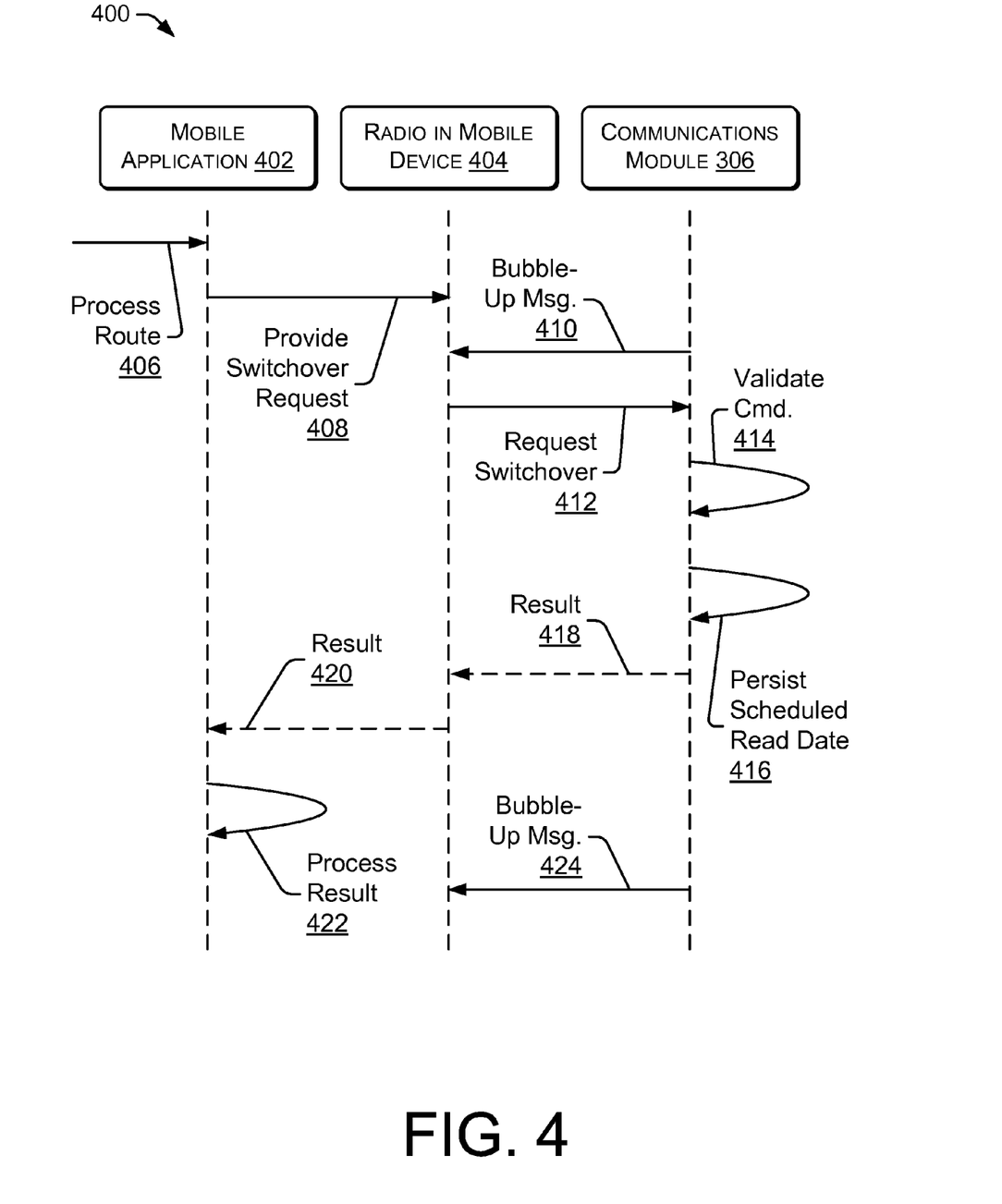
FIG. 4 is a system and timing diagram showing an example of processing a switchover command within a previously secured (i.e., cryptographically configured) smart meter.

FIG. 4 is a diagram 400 showing aspects of an example system and method of operation, including timing of events to process a switchover command within a previously secured (i.e., cryptographically configured) smart meter. The switchover command controls or initiates the automated reconfiguration (i.e., the "switchover") of a meter and/or node between mobile and network modes of operation. The example operation of the system includes actions or operations performed by one or more devices, including a general processor, software and/or specific hardware device 402 within mobile device 104, a radio 404 in the mobile device and the communications module 306 (seen in the node 102 of FIG. 3).

At operation 406, a mobile device is moved along a route, taking it to within communication distance of a plurality of nodes configured as a mobile mode system or environment. Each node may transmit (e.g., "bubble-up") a consumption message, which may include data regarding consumption of electricity, natural gas, water, etc. In the context of the example of FIG. 1, the nodes 102A through 102N transmit RF messages 106 to the mobile unit 104 as it passes along the route 108.

At operation 408, a processing unit in the mobile device provides a switchover request to the radio in the mobile device as contact is made with each node. In the context of the example of FIG. 1, the mobile device 104 sends the switchover request to some or all of the nodes 102A through 102N that it is to be switched from a mobile mode to a networked mode. The message may include a switchover time, which may be used to set the watchdog timer 134.

At operation 410, a consumption message is sent from the node to the mobile device. In the context of the example of FIG. 3, the consumption message is produced by the communications module 306, and includes meter data obtained from metrology 116. In one example, a consumption message is transmitted (e.g., "bubbled up") from the node to the mobile device 104 (e.g., in FIG. 1). The consumption messages may be secured or unsecured; however, command level security is enabled.

At operation 412, the switchover request is transmitted from the mobile device to the node. In one example, the node is receptive to incoming messages only during specific windows of time, such as immediately following transmission of a consumption message. Accordingly, the mobile device 104 may transmit the switchover request 412 following receipt of the bubble-up or consumption message 410.

At operation 414, the switchover message is validated by the node. In the example shown, the communications module 306 performs the validation. At operation 416, the scheduled read date is persisted or stored. At operations 418 and 420, the result of the validation of the switchover request is transmitted to the application 402 operating on the mobile device 104 (seen in FIGS. 1 and 2). At operation 422, this result may be processed on the mobile device 104.

At operation 424, bubble-up messages continue—that is, the mobile mode is continued—until the scheduled switchover date. In one example, the bubble-up messages may include a bit, flag or other indicator that is set to signify that a switchover is scheduled. If this bit or flag is set, the mobile device 104 may interrogate the meter 102 regarding the particulars of the switchover and its date, time or other particulars.

Figure 5:
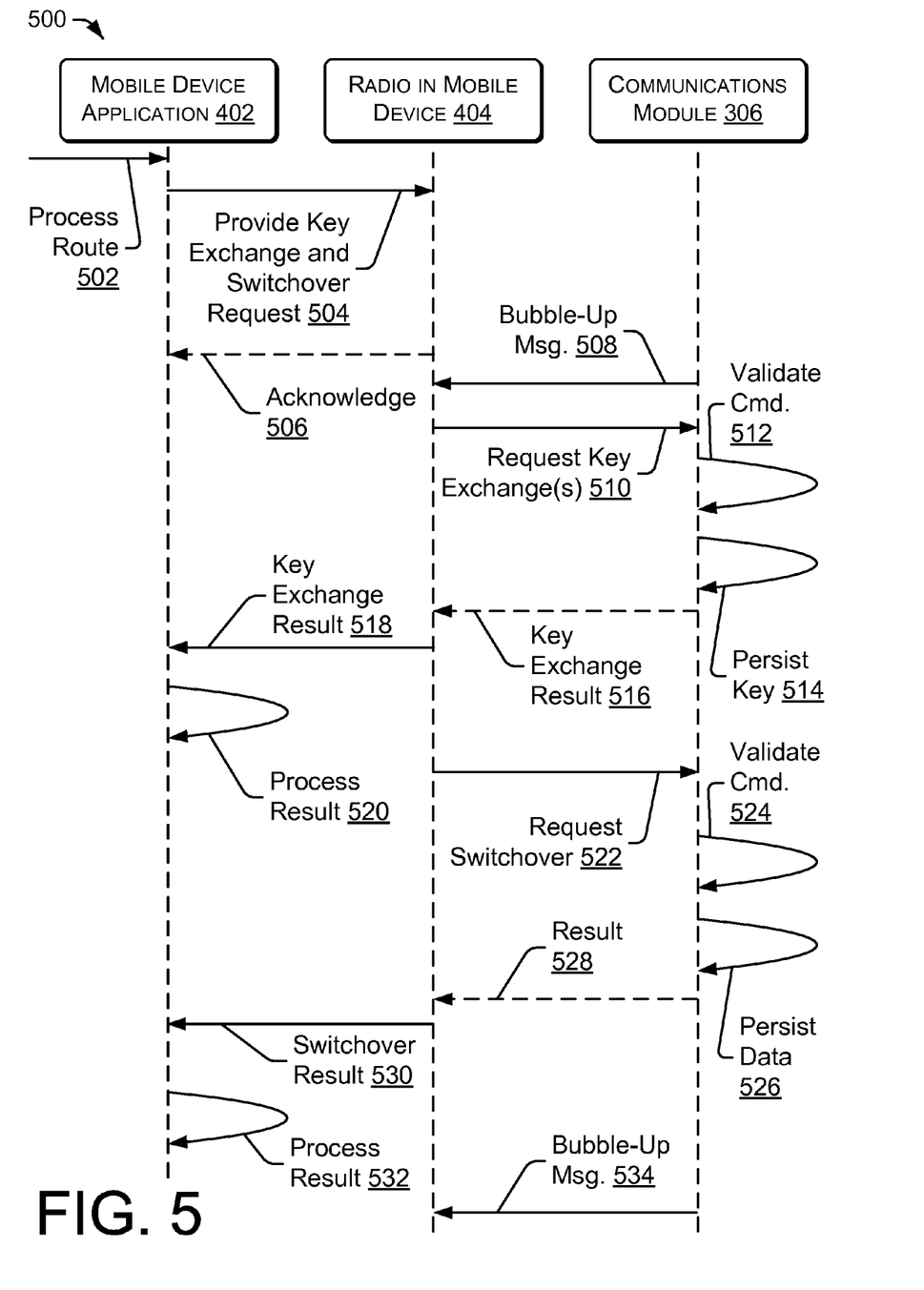
FIG. 5 is a system and timing diagram showing an example of processing a switchover command within a smart meter not having preconfigured cryptographic network security functionality.

FIG. 5 is a diagram 500 showing aspects of an example system and method of operation, including timing of events to process a switchover command within a previously unsecured smart meter or node (e.g., a meter having no preinstalled cryptographic keys). As an extension of the techniques described with respect to FIG. 4, the example system provides key exchange and switchover requests to provide system security.

At operation 502, a mobile device is moved along a route, taking it to within communication distance of a plurality of nodes configured as a mobile mode system or environment. At operation 504, key exchange commands and switchover requests are transmitted. The key exchange commands must be sent prior to the switchover command. Only command level keys are required, and reading keys (e.g., for receipt of consumption messages or data) are not required. At operation 506, the node acknowledges receipt of the key exchange command.

At operation 508, a bubble-up message, including consumption data, is sent from the node to the mobile device. At operation 510, receipt of the bubble up message may trigger transmission of a key exchange request from the mobile device to the node.

At operation 512, the key exchange request is validated. At operation 514, the key is persisted in memory of the node, such as in the communications module 306. At operations 516 and 518, the key exchange result is transmitted through the radio and back to the mobile device. At operation 520, the result is processed at the mobile device. At this point, the node and/or smart meter is secured, and appropriate command level cryptographic keys are available. Operations 522-534 are substantially similar to operations 412-424 of FIG. 4.

Figure 6:
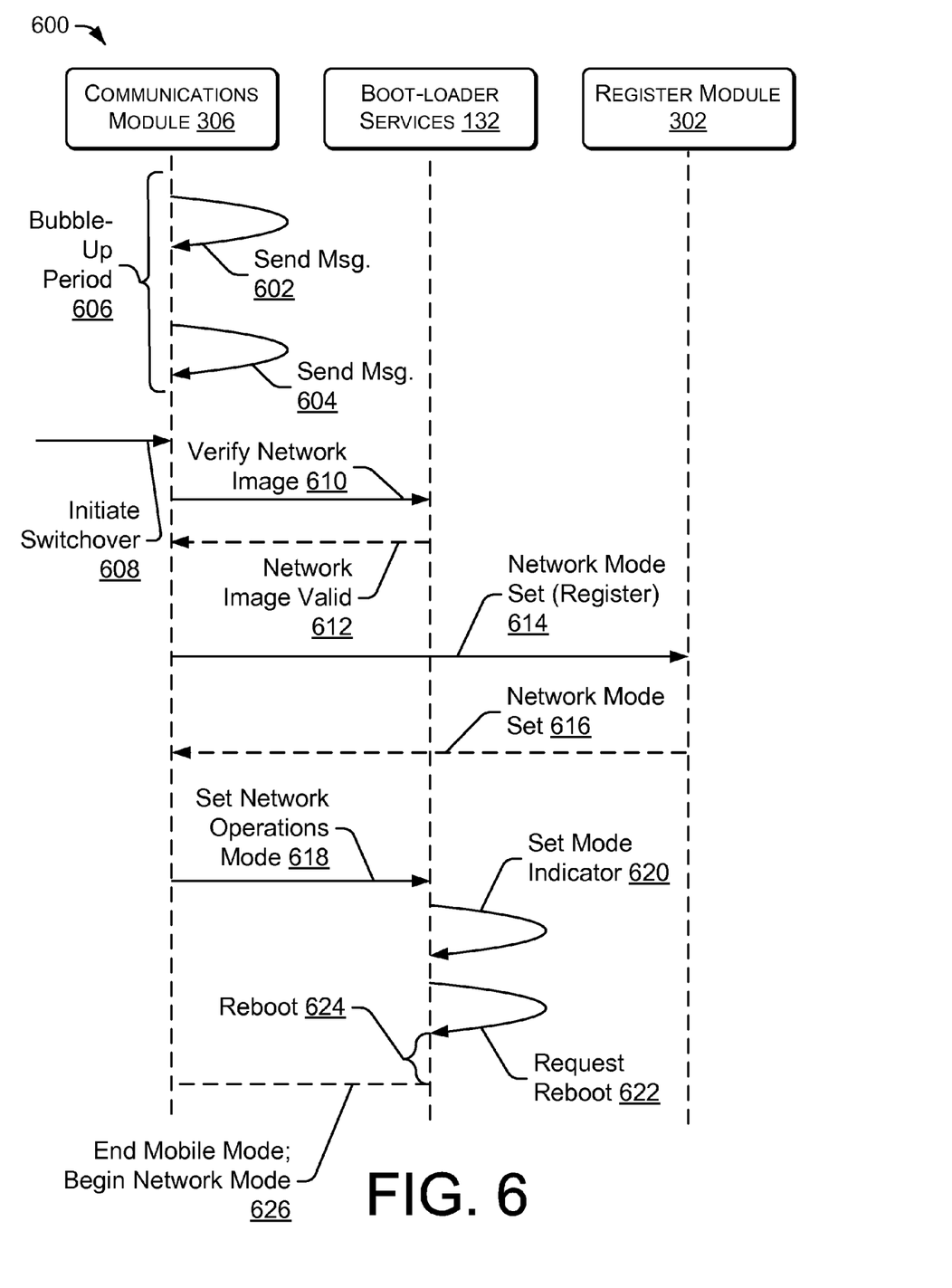
FIG. 6 is a system and timing diagram showing an example of executing a scheduled switchover from mobile mode to network mode.

FIG. 6 is a system view and timing diagram showing example techniques for processing a scheduled switchover of a node/smart meter from a mobile mode or state to a network mode or state. The example of FIG. 6 shows the relationship between the communications module 306, the boot-loader 132 and the register module 302, as shown in the examples of FIGS. 1-3. However, if similar functionality was differently distributed among components within a differently constructed system, then the method of operation and timing of events could be determined by analogy to the techniques described in FIG. 6.

Operations 602 and 604 are representative of a plurality of bubble-up consumption messages that may be sent by the communications module 306 during a bubble-up period 606 while the node is in the mobile mode or state.

At operation 608, a switchover is initiated. The switchover may be initiated by a watchdog timer or other event, and is initiated in accordance with a switchover request (e.g., a switchover request sent by an application 402 operational on the mobile unit 104 in FIG. 4).

At operation 610, the network image is verified. The verification process may be performed by a parity check algorithm or other techniques that determine if errors are present in the image (e.g., executable statements and/or data of the network application). The verification may be performed at the boot loader 132 or other location, as indicated by circumstances. At operation 612, the boot loader 132 reports that the network image is intact.

At operation 614, the communications module 306 directs the register module 302 to set or indicate a network mode, such as in a register, flag or expected memory location. At operation 616, the register module 302 indicates that a network mode had been set.

At operation 618, the communications module 306 directs the boot-loader 132 to set a network operations mode. At operation 620, the boot-loader sets a mode indicator, which will result in use of the network image (e.g., image 128 in FIG. 1) rather than the mobile mode image (e.g., image 126 in FIG. 1) upon reboot. At operation 622, the boot-loader 132 begins the reboot. The reboot proceeds for a duration 624, ending operation of the mobile mode and beginning operation of the network mode 626.

Figure 7:
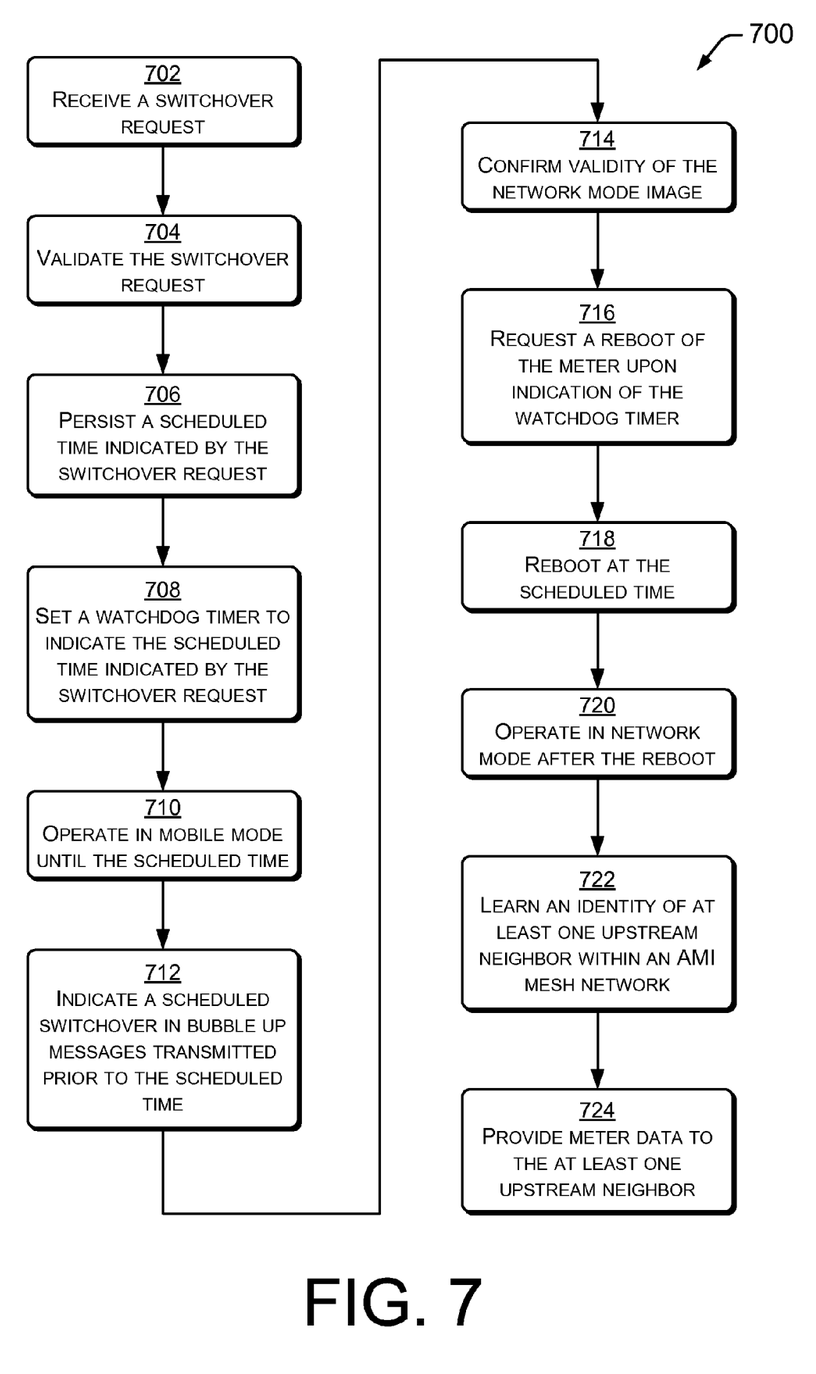
FIG. 7 is a flow diagram showing example operations usable to schedule and perform a switchover from mobile mode to network mode.

FIG. 7 is a flow diagram showing example operations 700 to provide automated reconfiguration of a node or smart meter from a mobile mode to a network mode. At operation 702, the node receives a switchover request, which may have been transmitted by a mobile device. Within the context of the example of FIGS. 1-3, the mobile device 104 may transmit the switchover request to a node 102, indicating a time to switch from the mobile mode to the network mode. The mobile device 104 may include a radio and computing functionality, such as a processor and memory to contain software instructions. The software instructions may be executable by the processor to operate the radio to send the switchover request to one or more meters. Upon receive by the one or more meters, the switchover request will initiate a discontinuation of operation of mobile mode software and to initiate operation of network mode software At operation 704, the switchover request is validated. The validation may be performed cryptographically, such as by operation of command keys. This prevents unauthorized alteration of the system. At operation 706, the scheduled switchover time is persisted in the memory of the node. In one example, at operation 708, a watchdog timer may be used to schedule the time of the switchover request. At operation 710, mobile mode operation continues until the appointed switchover time. For example, meter data may continue to be bubbled up by RF messages to a mobile device. At operation 712, during the mobile mode operation, bubbled-up consumption messages may include an indication of the switchover and/or the appointed time.

At operation 714, the validity of the network mode image may be confirmed, such as by a parity check or the like. At operation 716, a reboot is requested upon indication of the watchdog timer. At operation 718, the reboot is performed at the scheduled time, which was originally indicated by the switchover request sent by the mobile device.

At operation 720, the node operates in network mode after the reboot. At operation 722, each node may learn identifies of upstream and/or downstream neighbors within a network mesh network. As the mesh network forms, at operation 724, meter data and/or consumption messages are provided by nodes to upstream neighbors, thereby receiving, relaying and moving the consumption data within the mesh network by RF transmission to a head office or server.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of transitioning a meter between a mobile mode and a network mode, the method comprising:
    under control of one or more processors configured with executable instructions:
    operating in the mobile mode, wherein the operating comprises transmission of data indicating measurements of resource consumption to a radio of a mobile device;
    receiving a key exchange command before receiving a switchover request from the mobile device;
    providing a key exchange result of the key exchange command to the mobile device from which the switchover request was received;
    receiving the switchover request to switch from the mobile mode to the network mode, wherein the receiving is performed during a specific window of time following the transmission of the data indicating the measured resource consumption;
    validating the switchover request;
    persisting a scheduled time indicated by the switchover request;
    transmitting consumption messages according to the mobile mode, the messages comprising a flag to indicate a scheduled switchover responsive to the switchover request; and
    rebooting at the scheduled time, the rebooting using an image to provide functionality of the network mode.

2. The method of claim 1, additionally comprising:
    setting a watchdog timer to indicate the scheduled time indicated by the switchover request; and
    requesting a reboot of the meter upon indication of the scheduled time by the watchdog timer.

3. The method of claim 1, additionally comprising:
    confirming availability of the image to provide network functionality; and
    confirming validity of the image to provide network functionality.

4. The method of claim 1, additionally comprising:
    setting a mode indicator of the meter; and
    requesting a reboot of the meter, wherein the mode indicator is used in determining an image to be used.

5. The method of claim 1, additionally comprising:
    learning, following rebooting, an identity of at least one upstream neighbor within a mesh network; and
    providing meter data to the at least one upstream neighbor.

6. The method of claim 1, wherein the key exchange command provides security to a previously unsecured meter.

7. A system, comprising:
a mobile device, comprising:
   a radio;
   a processor; and
   memory containing software instructions, executable by the processor to operate the radio to send a switchover request, wherein the switchover request is configured to direct one or more meters to discontinue operation of mobile mode software and to initiate operation of network mode software; and
a plurality of meters, each comprising:
   one or more memory devices in which is defined the mobile mode software and the network mode software;
   a radio to receive the switchover request, wherein the radio is configured to operate and receive the switchover request during a specific window of time following transmission of a consumption message;
   a timer to maintain a scheduled switchover time for execution of the switchover request; and
   a boot loader in each of the plurality of meters to switch from execution of the mobile mode software to execution of the network mode software at the scheduled switchover time;
   wherein each of the plurality of meters is configured to:
      receive a key exchange;
      validate the switchover request using a key received in the key exchange; and
      persist the received key.

8. The system of claim 7, additionally comprising:
upstream and downstream flows of packets configured by the network mode software within a mesh network including at least one of an upstream neighbor or a downstream neighbor for each of the plurality of meters.

9. The system of claim 8, wherein each of the plurality of meters comprises:
   a radio transmitter to send consumption messages before the switchover and to send upstream packets after the switchover time; and
   a radio receiver to receive the switchover request before the switchover and to receive packets from downstream nodes after the switchover.

10. The system of claim 8, wherein the boot loader of each of the plurality of meters is configured to:
   confirm validity of an image defining the network mode software; and
   reboot the meter using the network mode software.

11. The system of claim 8, wherein each of the plurality of meters comprises:
   a register module;
   a communications module having a connector to the register module; and
   resource consumption measuring device connected to the register module.

12. A method of transitioning a meter between a mobile mode and a network mode, the method comprising:
   under control of one or more processors configured with executable instructions:
   operating in the mobile mode, wherein the operations comprise transmission of data indicating measurements of resource consumption to a radio of a mobile device;
   receiving a key exchange command from the mobile device;
   providing a key exchange result of the key exchange command to the mobile device;
   transmitting a consumption message, the transmitting performed by a radio of the meter and according to the mobile mode;
   receiving with the radio of the meter, the receiving performed during a specific window of time following the transmission of the consumption message;
   receiving a switchover request, the switchover request indicating a switch from the mobile mode to the network mode, wherein the switchover request was received during the specific window of time;
   validating the switchover request;
   persisting a scheduled time indicated by the switchover request;
   transmitting consumption messages according to the mobile mode, the messages comprising a flag to indicate a scheduled switchover responsive to the switchover request;
   sending a response to interrogation of the meter by the mobile device, wherein the response indicates the scheduled time; and
   rebooting at the scheduled time, the rebooting using an image to provide functionality of the network mode.

13. The method of claim 12, additionally comprising:
   setting a watchdog timer to indicate the scheduled time indicated by the switchover request; and
   requesting a reboot of the meter upon indication of the scheduled time by the watchdog timer.

14. The method of claim 12, additionally comprising:
   confirming availability of the image to provide network functionality; and
   confirming validity of the image to provide network functionality.

15. The method of claim 12, additionally comprising:
   setting a mode indicator of the meter; and
   requesting a reboot of the meter, wherein the mode indicator is used to determine an image to be used.

16. The method of claim 12, additionally comprising:
   learning, following rebooting, an identity of at least one upstream neighbor within a mesh network; and
   providing meter data to the at least one upstream neighbor.

17. The method of claim 12, wherein the key exchange command provides security to a previously unsecured meter.

* * * * *